H. A. PITTS.
Bee Hive.
No. 2,268. Patented Sept. 25, 1841.
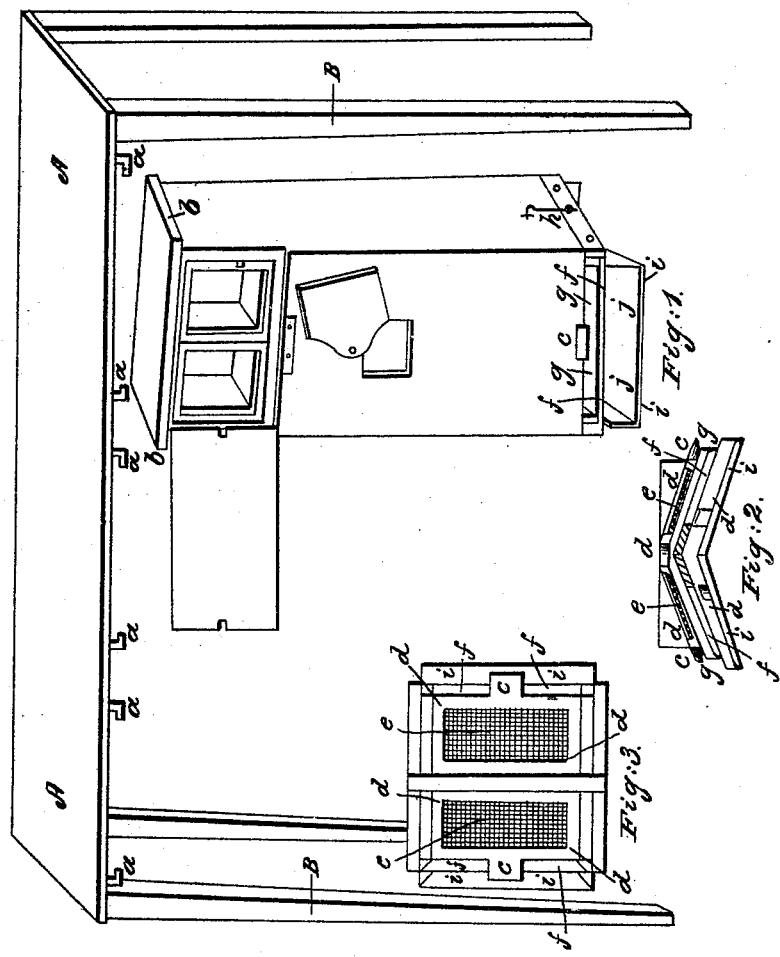

UNITED STATES PATENT OFFICE.

HIRAM A. PITTS, OF WINTHROP, MAINE.

CONSTRUCTION OF BEEHIVES.

Specification of Letters Patent No. 2,268, dated September 25, 1841.

*To all whom it may concern:*

Be it known that I, HIRAM A. PITTS, of Winthrop, in the county of Kennebeck and State of Maine, have invented an improvement in the manner of constructing and suspending beehives so as to secure them against the depredations of insects, which improved hive I denominate the "suspension and protection beehive"; and I do hereby declare that the following is a full and exact description thereof.

In the accompanying drawing, Figure 1, represents one of my hives, which, in its general construction, is similar to some of those heretofore made, but instead of placing my hives upon shelves, or of allowing them to stand upon legs, or other supports beneath them, I suspend them, either singly or in rows, by their upper sides, to a table top, platform, or any other convenient fixture above them. A, A, may represent such a table furnished with sliding pieces, or cleats, as at $a\,a$, which may receive the projecting ends $b$, $b$, of the top of the hive, in the manner of a sliding drawer. Or the hive may be suspended by means of hooks and staples, so as to produce a like effect. The legs, or supports, B, B, of the table A, A, may be placed in, or surrounded by, cups of tin, or other material, holding oil, or other fluid, to prevent the ascent of ants, or of other insects, so as effectually to protect the hives from all those that are not provided with wings.

A principal object of my improvement is to defend the bees from the depredations of that destructive insect, the bee moth; and this I effect by the peculiar manner in which I construct the bottoms of my hives, which bottom I denominate the protector.

In Fig. 1, $c$, is the opening for the entrance of the bees, which opening may be an inch in length, and of such height as will suffice to enable them to pass in and out; there may be a similar opening on the opposite side of the hive. The floor, or bottom, of the hive is ridge-shaped, consisting of two inclined planes, as shown in the cross section Fig. 2, which is taken in a vertical plane through the middle of the hive, from front to back. Fig. 3, is a top view of said floor, the upper section of which consists of two frames $d$, $d$, having panels of wire-gauze $e$, $e$, within them. Below this there is a second floor $f$, $f$, Fig. 2, of thin plank, with a space $g$, $g$, between the two. The space $g$, $g$, is open along the whole width of the hive, say twelve inches, more or less, on its front and back sides, as shown also at $g$, $g$, Fig. 1; and into this space the moth will generally enter, as it affords them a free, unobstructed, and inviting passage. The odor of the bees passes freely through the meshes of the wire-gauze and creates an atmosphere in the space $g$, $g$, similar to that of the hive itself; and in addition to this, I place a portion of comb in the middle of the space $g$, where I make an excavation, as at $g'$, to contain it; the moth thus decoyed deposits its eggs in this compartment, which may be readily cleaned out; and the worm be thus kept out of the hive. This bottom, or protector, is hooked on to the body of the hive as at $h$, and can be removed and replaced with facility. For greater security, I usually add a third floor, as shown at $i$, $i$, leaving a space between it and the floor $f$, $f$, which is similar to, and communicates at the middle with, the space $g$, $g$, which will thus operate so as to produce a double protection. By suspending the hives in the manner described they are not only defended, to a considerable extent, from the annoyance of insects, but the protector, or bottom, is left free to be removed and replaced without disturbing the hive.

Having thus fully described the nature of my invention, and shown how the same is carried into operation, what I claim therein as new, and desire to secure by Letters Patent, is—

The manner herein set forth of constructing the bottom, or protector; the upper floor, upon which the bees are to enter, consisting of frames with wire-gauze stretched across them, and there being below this, a second, and if desired, a third, floor having spaces between them for the entrance of the bee-moth, so prepared and furnished, in the manner described, as to induce the moth to deposit its eggs therein, and so arranged, and connected with the hive as to be readily removed and replaced, substantially as herein made known.

HIRAM A. PITTS.

Witnesses:
 THOS. P. JONES,
 R. P. BUTRICK.